United States Patent [19]

Franks, Jr.

[11] Patent Number: 5,114,354

[45] Date of Patent: May 19, 1992

[54] CLAMPING DEVICE

[76] Inventor: George J. Franks, Jr., 664 Thompson Cir., Inverness, Ill. 60067

[21] Appl. No.: 679,895

[22] Filed: Apr. 3, 1991

Related U.S. Application Data

[63] Continuation-in-part of Ser. No. 320,360, Mar. 8, 1989, Pat. No. 5,006,074, which is a continuation-in-part of Ser. No. 204,397, Jun. 9, 1988, Pat. No. 4,993,960, which is a continuation-in-part of Ser. No. 116,899, Nov. 5, 1987, Pat. No. 4,828,504.

[51] Int. Cl.⁵ .............................................. H01R 4/66
[52] U.S. Cl. .................................... 439/92; 439/433; 439/806
[58] Field of Search .................... 439/92, 95, 433–435, 439/803, 813

[56] References Cited

FOREIGN PATENT DOCUMENTS 161707 12/1957 Sweden ............................... 439/803
1085499 10/1967 United Kingdom ................ 439/434

Primary Examiner—Eugene F. Desmond
Attorney, Agent, or Firm—Jenner & Block

[57] ABSTRACT

A clamping device for mechanically and electrically connecting a wire to an object having at least one flat surface. A U-shaped clamping member carries a threaded stud for securing the clamped object at least partially within the U-shaped member. The stud carries a stud tip which can be constructed from a metal that is electrochemically similar to the clamped object to minimize galvanic corrosion effects between the stud tip and the clamped object. The clamping device also carries a wire attaching means for attaching a wire thereto.

14 Claims, 2 Drawing Sheets

CLAMPING DEVICE

RELATED APPLICATIONS

This is a continuation-in-part application of application Ser. No. 07/320,360, filed Mar. 8, 1989, issued as U.S. Pat. No. 5,006,074 on Apr. 9, 1991, which is a continuation-in-part of Ser. No. 07/204,397, filed June 9, 1988, which issued Feb. 19, 1991 as U.S. Pat. No. 4,993,960, which is itself a continuation-in-part application of Ser. No. 07/116,899, filed Nov. 5, 1987, now U.S. Pat. No. 4,828,504, issued May 9, 1989.

FIELD OF THE INVENTION

This invention relates in general to clamping devices for providing a mechanical and electrical connection between a grounding wire and an object having at least one flat surface.

BACKGROUND OF THE INVENTION

In supplying various utilities to a home, it is frequently desired that metal objects be connected to a suitable electrical ground or that a grounding wire be connected to a metal object which is already properly grounded. Such a ground connection is desirable because it can protect an individual or machine from serious harm in the event of a short circuit or other fault condition. Typically, a variety of clamping devices have been employed to accomplish the desired connection.

As is known in the art, these clamping devices can take the form of a U-shaped clamping device which can be secured to an object by placing the object at least partially within the U-shaped portion of the device and tightening a threaded stud member carried by the U-shaped portion against a generally flat surface of the object. A ground wire is then connected to the clamping device.

Ideally, a clamping device used as discussed above should possess several attributes. First, the device components themselves must be able to withstand the potentially high currents that can be encountered under some fault conditions. Second, the device must be able to effect an adequate physical and electrical connection between the ground wire and clamped object. Third, the clamping device must be of a design that will maintain a sound physical and electrical connection after prolonged use. Finally, the clamp must be simple and economical to construct and install.

Until now, clamping devices known in the art have not simultaneously possessed all these desirable attributes.

For example, the need for adequate physical and electrical contact between the clamped object and the clamping device suggests that the threaded stud member should be physically hard enough to penetrate or abrade the surface of the clamped object and any protective coating applied thereto. Ideally, the stud means could be constructed of a physically hard metal such as steel to accomplish this purpose. Unfortunately, steel has a relatively high electrical resistivity. Metals possessing a high electrical resistivity can heat up, deform or self-destruct when high electrical currents pass through them. Thus, a steel stud portion could overheat, distort, or be destroyed under the potentially high current conditions encountered in grounding applications. This in turn can reduce the clamping device effectiveness or destroy the clamp completely.

Alternatively, the stud could be constructed from copper or a copper alloy such as bronze having a low electrical resistivity. This would ensure that the stud could successfully carry the potentially high currents encountered under fault conditions. However, copper and bronze are physically soft metals. Therefore, a copper or copper alloy stud would not be physically hard enough to penetrate or abrade the clamped object's surface, thereby failing to effect adequate mechanical and electrical contact with the clamped object.

Differing electrochemical properties of the ground wire, object to be clamped and clamping device components can also compromise the operation of the clamping device. For example, when a copper or bronze stud is used in a clamping device which is clamped to a steel object, galvanic corrosion products can occur at the copper-steel interface. This problem is especially acute where, as in this case, the surface area of the dissimilar metal junction is relatively small. The galvanic corrosion products formed under these conditions can degrade the electrical efficiency of the clamping device, physically alter the clamped object and the clamping device components, and make removal of the clamping device difficult.

SUMMARY OF THE INVENTION

In accordance with the present invention, a novel clamping device possessing all of the desirable attributes discussed above provides a mechanical and electrical connection between an object to be clamped and a ground wire.

The clamping device of the present invention provides a U-shaped clamping member having first and second parallel portions that extend generally upward from a common base.

The first parallel portion of the clamping device carries a threaded stud member capable of axial movement toward or away from the second parallel portion. This stud is typically constructed from a low resistivity metal such as copper or bronze to permit the efficient conduction of large electrical currents. The end of the stud distal from the second parallel portion includes wire attaching structure for attaching a ground wire to the stud. The other stud end, nearer the second parallel portion, has a stud tip secured thereto in a manner that provides mechanical and electrical connection between the stud and stud tip. Typically, the end of the stud has a mating portion for receiving a stud tip having a complementary mating portion. Typically, the stud will have an aperture or a shank at the end and the stud tip will have a complementary shank or aperture, respectively, for mating the stud tip to the stud.

For example, if the stud has an aperture or open cavity, the stud tip has a mating portion with a shape complementary to the open cavity which allows the mating portion of the stud tip to be inserted therein, preferably securely, so that the tip rotates along with the rotation of the stud. Typically, the tip will have a shank end for insertion in a complementary aperture in the stud or vice versa. To ensure that the tip rotates with the stud, the shank and complementary aperture should be asymmetrical about the longitudinal axis of the stud. Thus, the shank may be square, triangular, oval or striated, for example. The stud tip also has an object contacting portion which includes an object contacting surface for contacting the flat surface of the object to be clamped.

The stud tip is typically constructed from a physically hard and tough metal such as steel so that the stud tip can abrade the surface of the clamped object. Additionally, the use of a steel tip eliminates the potential for galvanic corrosion at the stud tip-object surface interface when the clamped object is constructed from steel or a metal electrochemically similar to steel.

The clamping device is attached to an object having at least one flat surface by placing the object at least partially within the U-shaped clamping member with the object's flat surface oriented toward the stud tip. The threaded stud having the stud tip mated thereto is then advanced toward the flat surface until the object is clamped between the object contacting surface of the stud tip and the second side portion.

One object of the present invention is to provide an improved clamping device for effecting mechanical and electrical connection between an object and a ground wire.

Another object of the invention is to provide a clamping device which is capable of passing large electrical currents while maintaining the integrity of the mechanical and electrical connection between the clamped object and the ground wire.

Yet another object of the invention is to provide a clamping device which minimizes the deleterious effects of galvanic corrosion.

Still another object of the invention is to provide a clamping device that is simple to construct and easy to install.

Other objects and advantages of the invention will become apparent upon the following detailed descriptions with references to the drawings. Throughout the drawings, like reference numerals refer to like parts.

DETAILED DESCRIPTION OF THE PREFERRED EMBODIMENTS

FIGS. 1-5 illustrate several embodiments of a clamping device for mechanically and electrically connecting together a ground wire and an object having at least one flat surface. In these embodiments, in which like numbers indicate like parts, a novel clamping device is disclosed which is capable of forming a durable low resistance connection to a metal object. Both the clamp and the connection can withstand high current conditions without suffering mechanical or electrical degradation.

Figure 1:
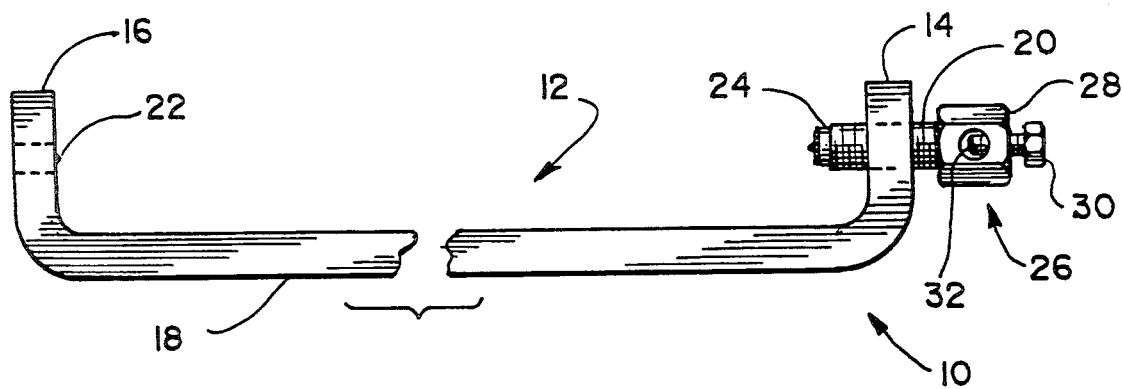
FIG. 1 is a perspective view of one embodiment of a clamping device used to connect a ground wire to an object with at least one flat surface.

As illustrated in FIG. 1, clamping device 10 includes a U-shaped clamping member 12 having a first parallel portion 14 and a second parallel portion 16 which extend outwardly from a common base 18. First parallel portion 14 carries a threaded stud 20 which is rotatable to effect axial movement of stud 20 with respect to first and second parallel portions 14 and 16. Second parallel portion 16 carries a parallel portion projection 22 which limits the movement of the object to be clamped during the clamping process.

Figure 3:
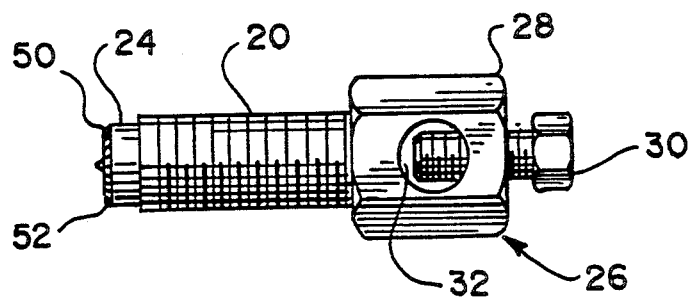
FIG. 3 is an enlarged side view of the threaded stud means, stud tip, and wire attaching means of FIG. 1.

The novel construction of the stud can be seen in greater detail in FIG. 3. Threaded stud 20 carries a stud tip 24 at the end of stud 20 nearer second parallel portion 16. Stud 20 also carries wire attaching structure 26 at the end of stud 20 distal from second parallel portion 16. Attaching structure 26 has a threaded stud head portion 28 having a bore 32 through which a ground wire can be inserted and secured therein by a ground wire securing screw 30. As shown in FIG. 3, threaded stud head portion 28 can have a hexagonal design to facilitate the rotation and resultant axial movement of stud 20. Preferably, stud 20 is constructed from a low resistivity metal such as copper or bronze. This provides for the efficient transfer of large electrical currents through stud 20.

Figure 4:
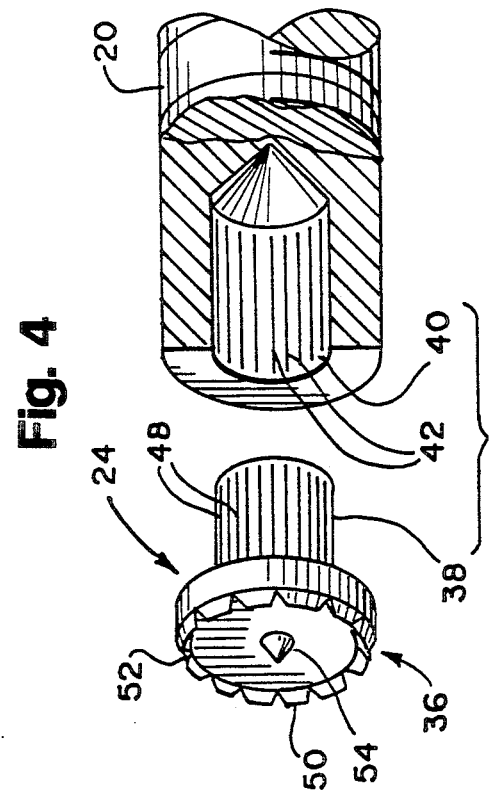
FIG. 4 is an exploded cross sectional view of the stud tip and threaded stud end portion shown in FIG. 3.

Stud tip 24 is shown in greater detail in FIG. 4. Stud tip 24 has a contacting portion 36 and a mating portion 38. Stud tip 24 is preferably constructed from a physically hard and tough metal such as steel to enable contacting portion 36 to abrade the surface of the object to be clamped. Furthermore, steel construction of tip 24 also eliminates the potential for galvanic corrosion between the stud tip and the clamped object when the clamped object is constructed from steel. Mating portion 38 has a shape complementary to an aperture or open cavity 40 in the end of stud 20. Alternatively, the aperture could be located in tip 24 and the complementary mating portion could be the end of stud 20. Alternatively, the stud tip could be welded or brazed to the stud or securely attached in any other suitable manner, such as in a press-fit relationship, as long as an electrical and mechanical connection is made between stud 20 and stud tip 24. By mechanical connection is meant that when stud 20 is rotated, stud tip 24 rotates with stud 20. By electrical connection is meant that stud tip 24 is in physical contact with stud 20 so that an electric current can readily pass through tip 24 and stud 20. Cavity 40 opens toward second parallel portion 16. Cavity 40 is preferably radically asymmetric to prevent tip 24 from twisting relative to stud 20 when stud 20 is tightened against or loosened from a clamped object. Radial asymmetry of some type is preferred so that tip 24 will turn with stud 20 when torque is applied to stud 20 when tip 24 is bearing on the surface of the object to be clamped, thereby ensuring abrasion of that surface.

As shown in FIG. 4, the preferred radial asymmetry can consist of a plurality of striations 42 on a cavity surface 44. Striations 42 run parallel to the axis of stud 20 to permit mating portion 38 to be inserted into cavity 40. The location and shape of striations 42 are complementary to a plurality of ridges 48 on a mating surface 50 of mating portion 38. In the preferred embodiment, mating surface 50 and cavity inner surface 40 provide a large surface area of contact between stud 20 and mating portion 38 to minimize the formation and effect of any galvanic corrosion products that might be caused by the use of dissimilar metals in stud 20 and stud tip 24. It is also preferred that the axial length of contacting portion 36 be limited to the thickness required for adequate physical strength. This minimizes the amount of high resistivity metal that any large electrical current must pass through, thereby minimizing the potential for heating and distortion of stud tip 24. Finally, it is also preferred that the diameter of contacting portion 36 be less than or equal to the root diameter of stud 20. This permits stud 20 to be threadably inserted into first parallel portion 14 when stud tip 24 has already been attached to stud 20.

Still referring to FIG. 4, contacting portion 36 has an object contacting surface 50. In the preferred embodiment, surface 50 consists of a circumferential outwardly extending serrated surface 52 which is capable of abrading the surface of the clamped object. The presence of surface 52 ensures that contacting surface 50 will penetrate any protective coating or oxidized metal on the outer surface of the clamped object, thereby enabling satisfactory electrical contact with base metal of the clamped object.

FIG. 4 also shows that contacting portion 36 carries a stud tip projection 54 which extends toward the flat surface of the clamped object and beyond serrated surface 52. When tightening clamping device 10 by rotating stud 20, projection 54 first encounters the flat surface of the object, thereby fixing the axis of rotation of stud tip 24 and stud 20.

Figure 2:
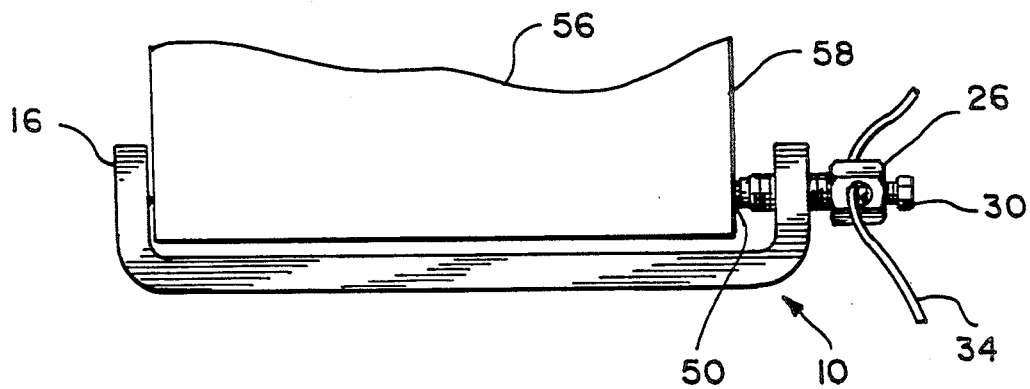
FIG. 2 is a side view of the clamping device of FIG. 1 attached to an object having at least one flat surface.

FIG. 2 illustrates clamping device 10 clamped to an object 56 having a flat surface 58. Object 56 is clamped between second parallel portion 16 and object contacting surface 50. A ground wire 34 is inserted in wire attaching structure 26 and held in place by a ground wire securing screw 30.

Figure 5:
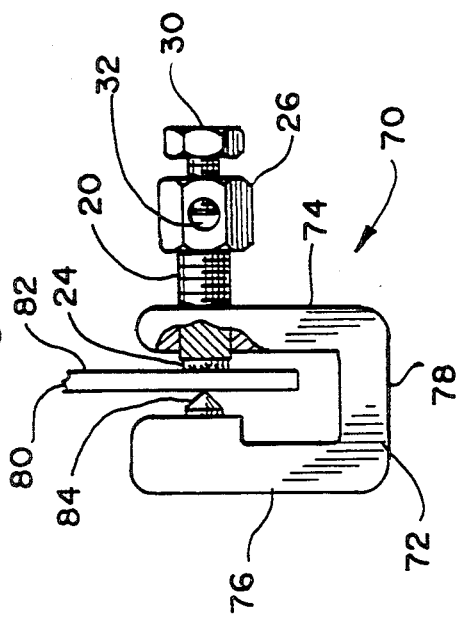
FIG. 5 is a side view of another embodiment of the clamping device.

The advantages of clamping device 10 are also useful in an alternative embodiment of the invention illustrated in FIG. 5. A clamping device 70 has a U-shaped clamping member 72 with a first parallel portion 74 and a second parallel portion 76 extending outward from a common base 78. First parallel portion 74 carries threaded stud 20 which is fitted with stud tip 24 as previously described. An object 80 having a flat surface 82 is clamped between tip 24 and a parallel portion projection 84 which protrudes from second parallel portion 76.

Figure 6:
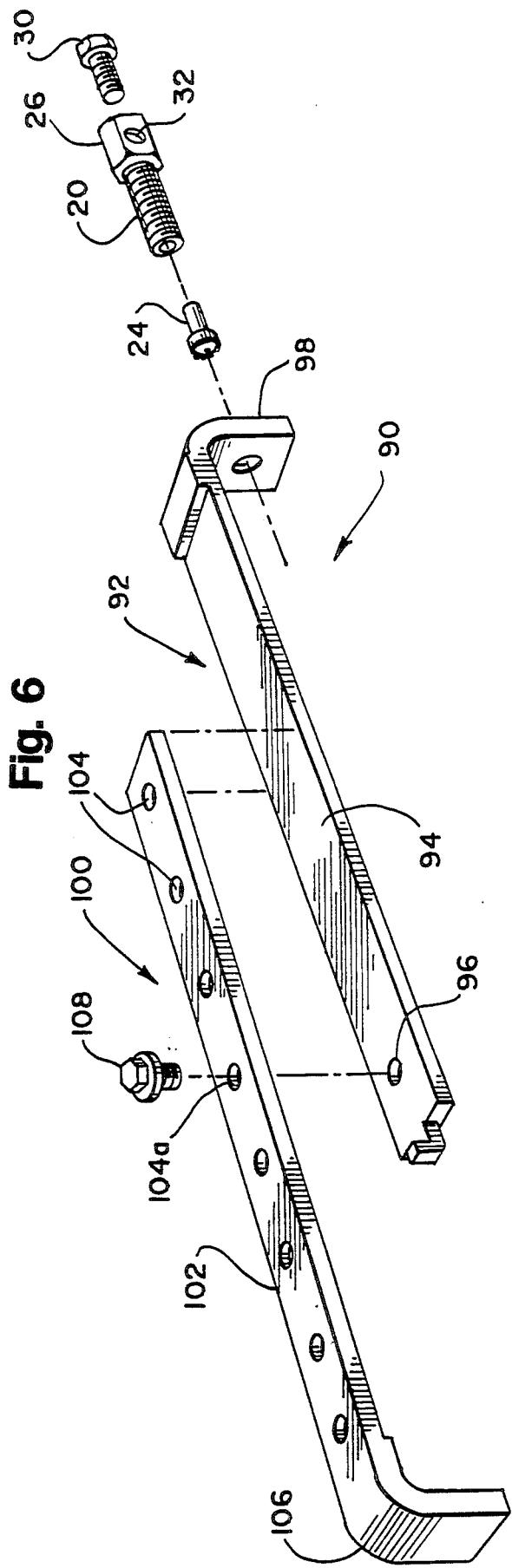
FIG. 6 is a perspective view of an adjustable embodiment of the invention.

FIG. 6 illustrates an adjustable embodiment of the clamping invention. A clamping device 90 has a first adjustable base member 92 with a first base portion 94 having a threaded aperture 96 as well as a first parallel portion 98 which carries threaded stud 20 and stud tip 24 as previously described. Second adjustable base member 100 has a second base portion 102 having a plurality of apertures 104 as well as a second parallel portion 106. The distance between first and second parallel portions 98 and 106 can be varied over a predetermined range by inserting threaded adjusting means 108 through an aperture 104a and into threaded aperture 96.

While the invention is described in connection with preferred embodiments, it will be understood that it is not intended to limit the invention to these embodiments. To the contrary, the invention is intended to cover all alternatives, modifications and equivalents as may be included in the spirit and scope of this invention as defined by the appended claims.

What is claimed is:

1. A clamping device for mechanical and electrical connection to an object having a flat surface comprising:
   a clamping member having a first and second portion extending outwardly from a common base for positioning therebetween an object to be clamped;
   a threaded stud carried by said first portion and extending therefrom toward said second portion, said threaded stud being rotatable to effect axial movement of said stud relative to said first and second portions;
   a stud tip composed of metallic material that is harder and tougher than the material of the stud comprising an object contacting portion and a mating portion;
   connection means for mechanically securing to and electrically connecting the end of said stud to said mating portion of said stud tip;
   said stud tip object contacting portion having an object contacting surface for contacting the flat surface of the object to be clamped, whereby the object can be placed at least partially within said clamping member and secured therein by axially moving said stud with said tip inserted therein toward said flat surface until the object is secured between said second clamping member portion and said object contacting surface;
   a wire attaching means for attaching a wire to said clamping device;
   wherein said connection means comprises an open cavity in the end of said stud nearer said second portion for mating with said stud tip and said mating portion of said stud tip comprises a shank portion complementary to and insertable within said open cavity of said stud, the axial dimension of said contacting portion being less than the axial dimension of said mating portion.

2. A clamping device for mechanical and electrical connection to an object having at least one flat surface comprising:
   a U-shaped clamping member having a first and second parallel portion extending outwardly from a common base for positioning therebetween an object to be clamped;
   a threaded stud carried by said first parallel portion and extending therefrom toward said second parallel portion, said stud being constructed of a low resistivity metal, said stud further being rotatable to effect axial movement of said stud relative to said first and second parallel portions, said stud further having a radially asymmetric open cavity in the end of said stud nearer said second parallel portion, and directed toward said second parallel portion;
   a stud tip having a diameter less than or equal to the root diameter of said threaded stud, said tip further comprising a contacting portion and a mating portion, said mating portion having a shape substantially complementary to said open cavity and insertable therein for providing mechanical and electrical connection between said threaded stud and said tip, and said contacting portion having an object contacting surface for contacting the flat surface of the object, said stud tip further being constructed of a different metal than said stud; and
   a wire attaching means for attaching a wire to said clamping device.

3. The clamping device of claim 2 wherein said stud tip is constructed of a metal with a physical hardness greater than the metal used to construct said threaded stud.

4. The clamping device of claim 3 wherein said stud tip is constructed of a metal with substantially similar electrochemical properties to the flat surface of the clamped object.

5. The clamping device of claim 4 wherein the axial dimension of said contacting portion is less than the axial dimension of said mating portion.

6. The clamping device of claim 3 wherein said object contacting surface comprises a serrated surface for abrading material bearing thereagainst.

7. The clamping device of claim 2 wherein said second parallel portion includes a parallel portion projection protruding from said second parallel portion in the direction of said first parallel portion.

8. The clamping device of claim 2 wherein said stud tip further comprises a stud tip projection directed toward said second parallel portion and projecting beyond said object contacting surface for maintaining a fixed axis of rotation of said threaded stud with respect to the object as said threaded stud is tightened against the flat surface.

9. The clamping device of claim 2 wherein said wire attaching means comprises:
  a threaded stud head portion having formed therein a bore for receiving a ground wire; and
  a ground screw for securing the ground wire to said threaded stud means.

10. A clamping device for mechanical and electrical connection to an object having at least one flat surface comprising:
  a U-shaped clamping means having a first and second parallel portion extending outwardly from a common base for positioning therebetween an object to be clamped;
  a threaded stud carried by said first parallel portion and extending therefrom toward said second parallel portion, said stud being constructed of a low resistivity metal, said stud further being rotatable to effect axial movement of said stud relative to said first and second parallel portions, said stud further having an open cavity in the end of said stud nearer said second parallel portion, said open cavity being directed toward said second parallel portion and having a cavity surface including a plurality of striations running parallel to the axis of said cavity;
  a stud tip having a diameter less than or equal to the root diameter of said threaded stud, said tip comprising a mating portion and a contacting portion, said mating portion having a shape substantially complementary to said open cavity and insertable therein for providing mechanical and electrical connection between said threaded stud and said tip, and said contacting portion having a serrated object contacting surface for contacting the flat surface of the object to be clamped, said stud tip being constructed of a metal having substantially similar electrochemical properties to the flat surface of the clamped object; and
  a wire attaching means comprising a threaded stud head portion having formed therein a bore for receiving a ground wire and a ground screw for securing the ground wire to said threaded stud.

11. The clamping device of claim 10 wherein said common base comprises an adjustable base member and an adjusting means for varying the length of the base member within a predetermined range of lengths.

12. The clamping device of claim 11 wherein said second parallel portion comprises a parallel portion projection protruding from said second parallel portion in the direction of said first parallel portion.

13. The clamping device of claim 10 wherein said stud tip further comprises a stud tip projection directed toward said second parallel plate and projecting beyond said object contacting surface for the purpose of maintaining a fixed axis of rotation of said threaded stud with respect to the object as said threaded stud is tightened against the flat surface.

14. The clamping device of claim 10 wherein the axial dimension of said contacting portion is less than 7 millimeters in axial dimension.

* * * * *